(12) United States Patent
de Jong et al.

(10) Patent No.: US 7,048,958 B2
(45) Date of Patent: May 23, 2006

(54) STEAM HEATER

(75) Inventors: Peter de Jong, Montfoort (NL); Rudolph Eduardus Maria Verdurmen, Utrecht (NL); Albertus Egbert Steenbergen, Bennekom (NL)

(73) Assignee: Stichting Nederlands Instituut Voor Zuivelonderzoek (NIZO), Ede (NL)

( * ) Notice: Subject to any disclaimer, the term of this patent is extended or adjusted under 35 U.S.C. 154(b) by 404 days.

(21) Appl. No.: 10/203,125

(22) PCT Filed: Feb. 5, 2001

(86) PCT No.: PCT/NL01/00090

§ 371 (c)(1),
(2), (4) Date: Oct. 17, 2002

(87) PCT Pub. No.: WO01/56394

PCT Pub. Date: Aug. 9, 2001

(65) Prior Publication Data

US 2003/0096045 A1    May 22, 2003

(30) Foreign Application Priority Data

Feb. 4, 2000 (NL) .................................. 1014287

(51) Int. Cl.
*A23C 3/02* (2006.01)

(52) U.S. Cl. ...................... 426/511; 426/521; 426/522; 99/453; 99/467; 99/483; 261/76; 261/DIG. 10; 261/DIG. 76

(58) Field of Classification Search ................. 426/521, 426/522, 511, 476, 474, 467; 99/453, 467, 99/483; 261/76, DIG. 76, DIG. 10
See application file for complete search history.

(56) References Cited

U.S. PATENT DOCUMENTS

| 1,468,420 A | 9/1923 | Stearns |
| 2,022,419 A | 11/1935 | Horneman |
| 2,130,645 A | 9/1938 | Horneman |
| 2,353,912 A | 7/1944 | Lindsey |
| 4,160,002 A | 7/1979 | Janovtchik |
| 4,689,237 A | 8/1987 | Fabre .......................... 426/521 |

FOREIGN PATENT DOCUMENTS

| BE | 538 399 | 6/1955 |
| CH | 501 368 | 1/1971 |
| EP | 0 800 775 | 10/1997 |
| FR | 1 084 436 | 1/1955 |
| GB | 726 452 | 3/1955 |
| GB | 2 154 121 | 9/1985 |
| WO | WO 84/02062 | 6/1984 |
| WO | WO 98/07328 | 2/1998 |

*Primary Examiner*—Drew Becker
(74) *Attorney, Agent, or Firm*—Weingarten, Schurgin, Gagnebin & Lebovici LLP

(57) ABSTRACT

The invention relates to a device for treating a fluid product (4) such as a dairy product, with heat (6), the product (8) being transported with steam through a product conduit for treating the product with heat coming from the steam, the product treated with heat being subsequently supplied to an expansion tank (10) for cooling the product.

32 Claims, 4 Drawing Sheets

STEAM HEATER

The invention relates to a device for treating a fluid product such as a dairy product with heat, the device being provided with at least one product conduit through which, in use, the product and steam are transported for treating the product with heat coming from the steam, and an expansion tank for cooling the product coming from the product conduit, the product conduit being provided with an outflow opening terminating in the expansion tank, at least one steam inflow opening, at least one product inflow opening and a flow restriction forming a flow resistance located downstream of the steam inflow opening and the product inflow opening.

The invention also relates to a method for treating a fluid product such as a dairy product with heat, the product being transported with steam through at least one product conduit for treating the product with heat coming from the steam, the product treated with heat being subsequently supplied to an expansion tank for cooling the product, and wherein, in the product conduit, a restriction is included.

Such a device and method for giving a heat treatment to the fluid product in the form of a liquid is known from WO 84/02062. The essence of such a heat treatment is that, during a short period of time, the product is brought to an elevated temperature and is then rapidly cooled. This heat treatment has advantages over a heat treatment whereby the product is brought to a somewhat less elevated temperature for a longer period of time. An advantage to be mentioned in this context is that the destruction of bacteria proceeds more effectively at higher temperatures. Hence, the detrimental effects on the product upon a heat treatment can be minimized, while the destruction of harmful microorganisms takes place to a sufficient extent.

In the known device of WO 84/02062, the product conduit proceeds downstream of the restriction into the expansion tank. This has as a consequence that the temperature of the fluid product downstream of the restriction will decrease somewhat gradually and therefore not abruptly. Downstream of the restriction, the fluid product remains warm due to the product conduit. This, in turn, has as a consequence that the product remains warm relatively long, so that the above-mentioned detrimental effects on the product upon the heat treatment are not optimally minimized.

Further, the known device has as a disadvantage that the product conduit downstream of the restriction will become foul because the product will cake there at the product conduit still hot. This, in turn, has as a result that the device can be used relatively briefly (a few hours, at a rough estimate) after which it has to be cleaned, in particular when a product for consumption is involved.

The invention aims to meet the drawbacks mentioned and is characterized in that the flow restriction also forms the outflow opening of the product conduit, so that downstream of the restriction no side walls of the product conduit are present. Owing to the product conduit not extending downstream of the restriction, the product leaving the restriction will directly cool in the expansion tank. The fact is that the restriction is the extremity of the product conduit and terminates directly in the expansion tank. This also implies that the product cooling downstream of the restriction cannot cake at the product conduit.

With this device, the product in the product conduit is quickly heated and, at the extremity of the product conduit, just before it terminates in the expansion tank, a relatively high temperature can be achieved since the product remains at this temperature level only for a relatively very short time. After flowing through the restriction, the product will cool directly in the expansion tank. Due to the fact that the product takes the maximum temperature for a very short time, this temperature can be chosen higher than in the known device without the product sustaining detrimental effects such as protein denaturation. On the other hand, the brief high temperature has as a result that the microbiological inactivation will be much more than one decimal reduction.

According to a possible embodiment of the invention, the outflow opening is situated in the tank in a staggered position relative to an inner wall of the tank.

According to an alternative embodiment, however, the outflow opening is situated in a surface of an inner wall.

In a preferred embodiment of the device according to the invention, the product conduit extends in an opening of the tank and in the opening is connected to the tank by means of a heat insulating seal. In this manner, the product conduit near the combined restriction and outflow opening can remain properly hot while the walls of the expansion tank are hardly heated. Thus, caking of the, product to an inner wall of the expansion tank is prevented.

Preferably, the at least one steam supply opening is situated downstream in relation to the at least one product supply opening.

Further, in particular, a volume of the product conduit situated between the at least one steam supply opening and the restriction is designed to be adjustable. This enables variation of the length of time during which the product is hot before it flows through the restriction to proceed to cool. In particular, the length of the product conduit situated between the steam supply opening and the restriction is designed to be adjustable.

Preferably, the device is dimensioned such that, in use, the steam is fully condensed upstream of the restriction. In this manner, the temperature before the restriction will be constant and will have reached the highest level.

In particular, the device is further provided with steam supply means for supplying the steam under pressure to the at least one steam supply opening. Further, the device can be provided with a sensor for measuring the temperature in a part of the product conduit situated downstream of the at least one steam supply opening and the at least one product supply opening. In particular, the steam supply means are arranged for regulating the amount of steam which is supplied to the product conduit, depending on the measured temperature.

Further, it is preferred that the restriction has a length which is approximately equal to the diameter of the restriction.

When the restriction has a diameter of 0.5–5 [mm], and preferably approximately 2 [mm], it appears that in the restriction no vapor will egress, so that no bubbles form. Thus, it is prevented that the flow rate is limited because a critical maximum speed has been reached. In the known device, by contrast, the flow rate is limited by a condition in which vapor will egress in the restriction, a condition which is indicated in WO 84/02062 as a critical regime.

Also, in particular, in the use for a liquid product, due to the restriction droplets of product are formed in the expansion tank. Thus, in the expansion tank, enlargement of the surface of the product occurs so that the product cools quickly.

A favorable embodiment of the device is further characterized in that the product conduit has a diameter of approximately 12 [mm], that the part in which the holes are provided extends over a length of approximately 100 [mm] and that therein a minimum of 2 and for instance 30 holes, each having a diameter of approximately 1 [mm] are provided. In particular, a device is characterized in that the expansion tank has a diameter of at least 500 [mm] and a height of at least 500 [mm].

In WO 98/07328, a method is described according to which such heat treatment can be given. This method is a direct heat treatment, which means that the product to be heated is brought into contact with steam, after which the steam condenses in the product. In the method mentioned, the product is mixed with steam in a mixing chamber, as a result of which a mixture of product, steam and condensate is formed. Here, an excess of steam is supplied. Subsequently, transport of this mixture through a product conduit takes place. Here, the residence time of the product in the product conduit is determined by the amount of steam supplied. The product flows via the product conduit, a controllable valve forming a flow restriction and a subsequent conduit to an expansion tank. For a relatively long period of time the product remains at a maximum temperature $T^{(1)}_{max}$. The product having reached the expansion tank expands and thereby cools. Via a discharge opening in the expansion tank, the treated product can be obtained. The steam leaves the expansion tank through a separate discharge opening.

In the method described in WO 98/07238, the product is already brought to a higher temperature in the mixing chamber. Subsequently, the mixture is transported through the product conduit. This means that, during a part of the residence time in the mixing chamber and during the whole time of transport through the product conduit to the expansion tank, the product is at virtually the maximum heating temperature. In this feature resides the first drawback of the method, since this relatively long period of time imposes a restriction on the maximum temperature to which the product can be heated without detrimental effects on the product, such as denaturation of proteins. A second drawback of the method mentioned is that the residence time in the mixing chamber is not equal for all product parts, which is disadvantageous for the final quality of the product.

The method according to the invention is characterized in that, with the aid of the restriction, downstream of the restriction in the expansion tank drops of liquid are formed from the product in the expansion tank. As a result, in the expansion tank, enlargement of the surface of the product occurs so that the product cools quickly.

BRIEF DESCRIPTION OF THE DRAWINGS

In the following, the invention is further elucidated on the basis of the drawing. In the drawing.

DETAILED DESCRIPTION OF THE INVENTION

Figure 1:
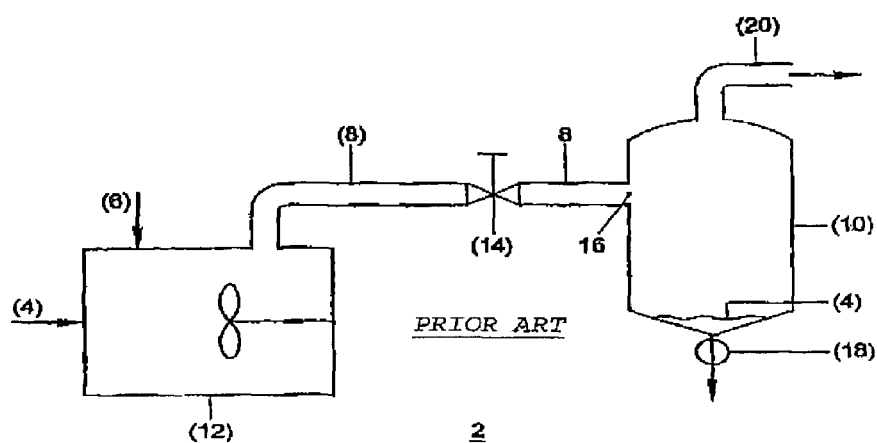
FIG. 1 shows a schematic representation of a known device for treating a product with heat.

In FIG. 1, a known device 1 is shown for treating a fluid product, such as a dairy product, with heat. The product 4 is transported through a product conduit 8 with steam 6 for treating the product with heat coming from the steam. The product treated with heat is subsequently supplied to an expansion tank 10 for cooling the product. The device is further provided with a mixing chamber 12 in which the steam 6 is mixed with the product. In the product conduit, a valve 14 is also disposed, with which the pressure upstream of the valve 14 in the product conduit is kept at a level. Downstream of the valve 14 the product conduit 8 proceeds to an outflow opening 16 which is situated in the expansion tank 10. The expansion tank 10 is further provided with a product discharge opening 18 for discharging the cooled product from the expansion tank 10 and a steam discharge opening 20 for discharging the steam from the expansion tank 10.

Figure 3A:
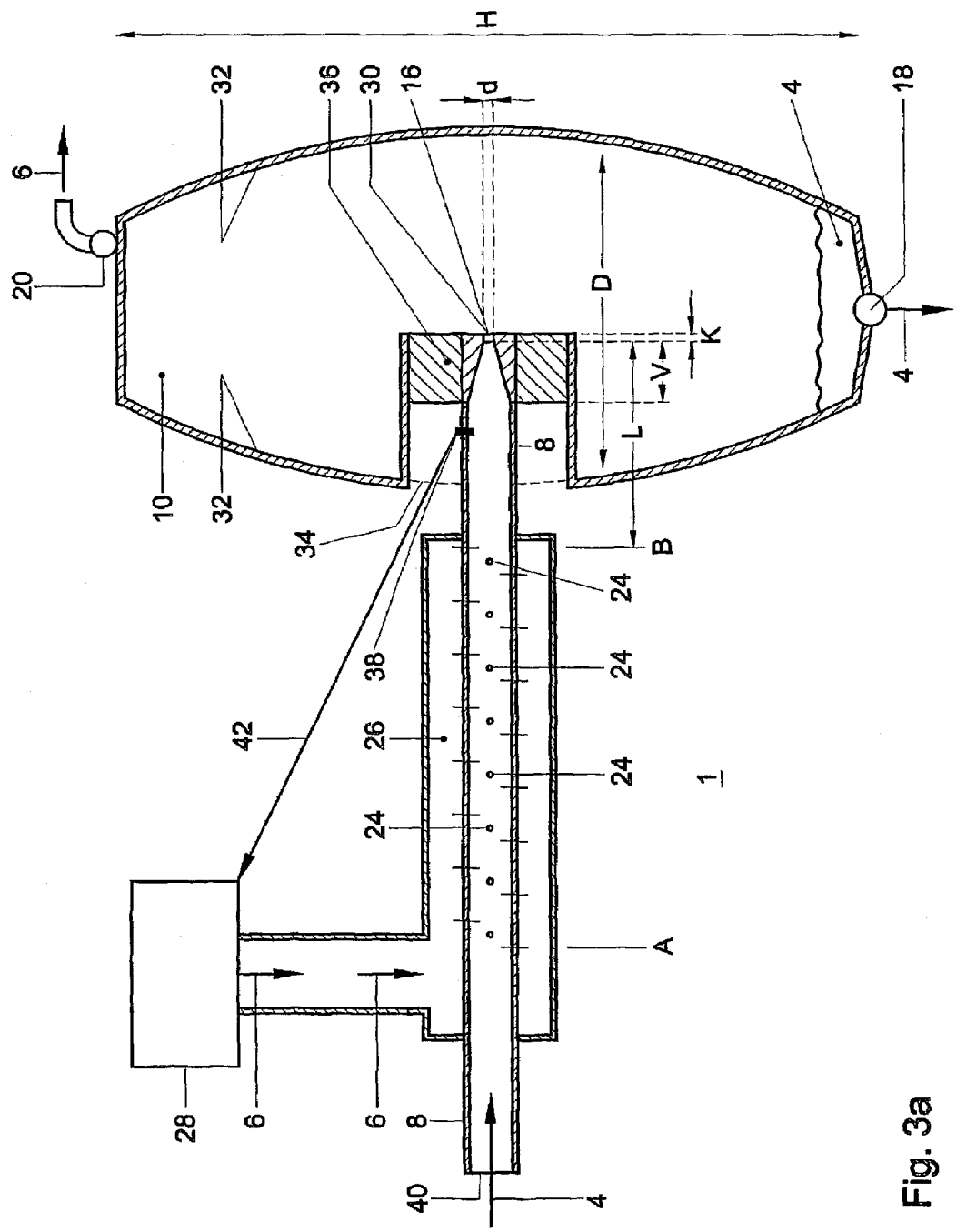
FIG. 3a shows a schematic representation of a first embodiment of a device according to the invention for treating a product with heat.

FIG. 3a shows a first embodiment of a device according to the invention, corresponding parts in FIG. 1 and FIG. 3a being provided with the same reference numerals. A side wall 22 of the product conduit 8 is provided with a plurality of steam supply openings 24. The product 4 is supplied to the product conduit 8 at a pressure of, for instance, [4–15] bar. Around the part of the product conduit 8 in which the steam supply openings 24 are provided, a steam chamber 26 is situated, so that the steam supplied under pressure to a steam chamber with the aid of steam supply means 28, subsequently spouts into the product conduit 8 via the steam supply openings 24.

Figure 4:
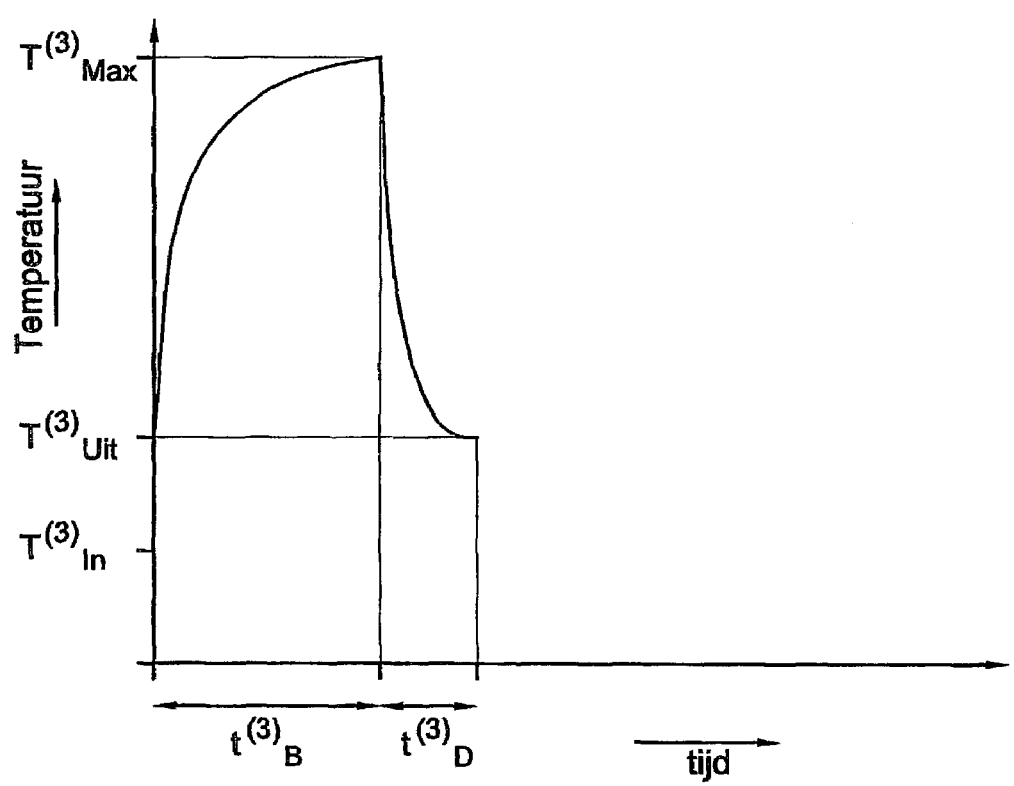
FIG. 4 shows a graph with a possible temperature curve of the product undergoing a heat treatment in the device of FIGS. 3a and 3b.

With the device according to the invention in FIG. 3a, it is possible to give the product, in the product conduit 8, a flow time $t^{(1)}_B$ of less than 1000 [ms] and, in particular, of less than 100 [ms]. During this time, the product is heated from a temperature $T_{In}$ of [1–110][° C.] to a temperature $T_{max}$ of [80–200][° C.]. An associated, possible temperature curve of the product is given in FIG. 4. Along the horizontal axis, a linear time scale is included and along the vertical axis a linear temperature scale is included. In FIG. 4, $t^{(3)}_B$ is the average time the product is present in the product conduit, and $t^{(3)}_D$ is the average time the product cools in the expansion tank 10.

Figure 2:
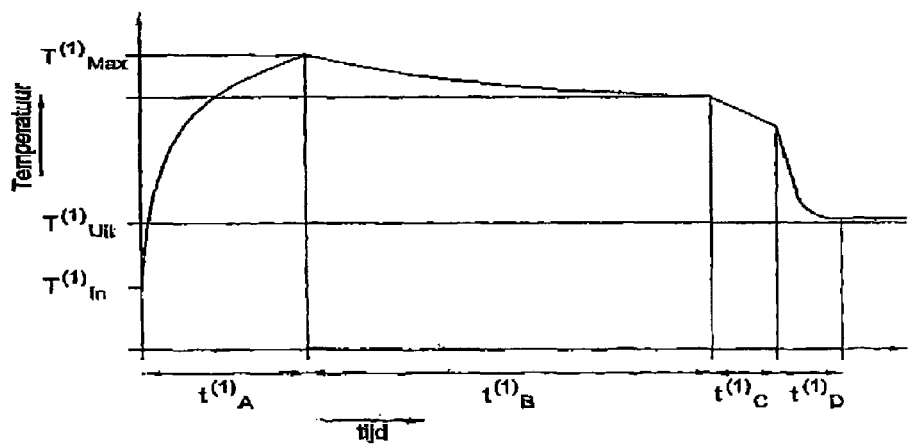
FIG. 2 shows a possible temperature curve of the product undergoing a heat treatment in the device of FIG. 1.

FIG. 2 gives a possible temperature curve of the product which is heated by the device according to the state of the art of FIG. 1. The axes of FIG. 2 have the same scale as the corresponding axes in FIG. 4. In FIG. 2, $t^{(1)}_A$ is the average length of time the product is present in the mixing chamber 12, $t^{(1)}_B$ is the average time the product is present downstream of the mixing chamber 12 in the product conduit, $t^{(1)}_C$ is the average time the product is present downstream of the valve 14 and upstream of the outflow opening in the product conduit 8, and $t^{(1)}_D$ is the average time the product cools in the expansion tank 10. A comparison of FIGS. 2 and 4 shows that the product treated by the device in FIG. 3a can be at a possibly higher temperature during a shorter period than the product treated by the device of FIG. 1 ($t^{(3)}_B < [t^{(1)}_A + t^{(1)}_B]$, $[T^{(3)}_{Max} - T^{(3)}_{In}] > [T^{(1)}_{Max} - T^{(1)}_{In}]$ and $T^{(3)}_{max} > T^{(3)}_{max} > T^{(1)}_{max}$. Naturally, if so desired, $T^{(3)}_{Max}$ can be less than or equal to $T^{(1)}_{max}$. What remains, however, is that the residence time $t^{(3)}_B$ can be shorter than in the known device. This is the result of the fact that in the device according to the invention, via the steam chamber, the steam spouts directly via steam supply openings into the product conduit. The temperature of the steam is then [150–230][° C.] with an associated pressure of [5–28][bar]. Thus, it is possible, with the device according to the invention of FIG. 3a, to heat the product very quickly, to realize short residence times and to realize a more limited spread in this residence time. Due to the fact that the product takes the maximum temperature $T^{(3)}_{max}$ for a very short period of time, this temperature $T^{(3)}_{max}$ can be chosen higher than $T^{(1)}_{max}$, without the product suffering detrimental consequences such as protein denaturation. On the other hand, however, the short-lived high temperature $T^{(3)}_{max}$ does have as a result that the microbiological inactivation is much more than one decimal reduction. Additionally, it is possible to inactivate heat resistant spores with much more than one decimal reduction. Thus a high product quality is achieved.

The device is further optimized by the provision of a flow restriction 30. The flow restriction 30 is at the same time the outflow opening 16 of the product conduit so that downstream of the restriction, no side walls of the product conduit are present. The product conduit gradually narrows downstream over a length V as far as the restriction 30. This is, however, not requisite, an abrupt transition is also possible. Due to the product conduit not extending downstream of the restriction, the product leaving the restriction will cool directly in the expansion tank. In fact, the restriction is the extremity of the product conduit and terminates directly in the expansion tank. This also implies that the product cooling downstream of the restriction cannot cake in the product conduit. Here, the restriction also forms a spout nozzle, see FIG. 3a, situated at the extremity of the product conduit in the expansion tank 10. By placing the flow restriction at the end of the product conduit in the expansion tank, it is achieved that the product, very rapidly after achieving the maximum temperature $T^{(3)}_{Max}$, ends up via the flow restriction in the expansion tank, where the product cools directly. The result is that the product, after a short heating period $t^{(3)}_B$, traverses a very short cooling period $t^{(3)}_D$ by expansion in the expansion tank 10. This cooling period is much shorter than the cooling period $t^{(1)}_C + t^{(1)}_D$ of the device according to FIG. 1.

The pressure in the expansion tank is for instance [0.02–0.9][bar]. After the product has cooled to a temperature $T^{(1)}_{Out}$ of [20–90][° C.], the product can be collected via the discharge opening 18. The steam leaves the expansion tank via the opening 20.

With the device according to FIG. 3a, the outflow opening is situated in the expansion tank 10 at a staggered position relative to an inner wall of the expansion tank 10. The product conduit 8 extends in an opening 34 of the tank and is connected in the opening 34 to the expansion tank 10 by means of a heat insulating seal 36 (for instance a Teflon ring). As a result, near the combined restriction and outflow opening, the product conduit can remain properly hot while the walls of the expansion tank are hardly heated. Thus, caking of the product to a possible outer side of the product conduit (which outer side is now sealed by the seal 36) in the expansion tank and to the wall of the expansion tank is prevented. Caking to the inner wall of the expansion tank is also prevented because this wall remains cool.

In this example, a volume of the product conduit 8 situated between the steam supply openings 24 and the restriction 30 is adjustable. Here, this is realized, for instance, in that the length L of the product conduit situated between the steam supply opening 24 located most downstream and the restriction 30 is designed to be adjustable. By increasing or decreasing the length L (the part between B and C; see FIG. 3), the heat preserving time of the product (the time the product has the maximum temperature $T^{(3)}_{max}$) can be increased and decreased, respectively.

The device is dimensioned such that, in use, the steam is fully condensed upstream of the restriction. It is only then that the temperature of the product is constant and that it has reached its maximum. Then, the steam is condensate. For instance, the dimensioning can consist in tuning the product flow rate, steam flow rate, diameter and/or length restriction and/or diameter product conduit.

The device is further provided, for instance, with a sensor 38 for measuring the temperature in a part of the product conduit situated downstream of the steam supply openings 24 and the at least one product supply opening 40. Via an electric line 42, the sensor is connected to the steam supply means 28. The steam supply means are, for instance, arranged for regulating the amount of steam supplied to the product conduit depending on the measured temperature. In this manner, the respective maximum temperature $T^{(3)}_{Maxc}$ can be accurately measured and regulated. Thus, this maximum temperature can, for instance, be regulated to a predetermined value.

Preferably, the restriction has a diameter d which is in the interval [0,5–5][mm]. In particular, the restriction has a length k, which is approximately equal to the diameter of the restriction. It appears very advantageous when the restriction has a length smaller than 3 [mm], for instance a length of approximately 2 [mm]. With this limited length it appears that in the restriction no steam will egress, so that the formation of bubbles, limiting the flow rate owing to the maximum critical speed being achieved, is prevented.

In this example, the product conduit has a diameter of approximately 10 [mm]. In this example, the part (from A to B; see FIG. 3a) in which the steam supply openings are provided extends over a length of approximately 120 [mm]. The steam supply openings each have, for instance, a diameter of approximately 1 [mm]. The product conduit is provided, for instance, with approximately thirty steam supply openings 24. The expansion tank has, for instance, a maximum diameter D of at least 500 [mm] and a height H of at least 500 [mm]. In particular, the expansion tank has a content of approximately 180 liters.

When used for a liquid product 4, the restriction also provides that through the restriction droplets of product are formed in the expansion tank. The restriction 30/outflow opening 16 therefore at the same time forms a nozzle. By the formation of droplets, the surface of the product leaving the restriction is enlarged so that the product will cool more rapidly in the expansion tank.

With the device from FIG. 3a, it is possible, for instance, to obtain a product flow of [100–50,000][l/h]. This will require, for instance, a steam flow rate of [1000–2,000,000 l/h] and a condensate flow rate of [10–20,000][l/h].

Figure 3B:
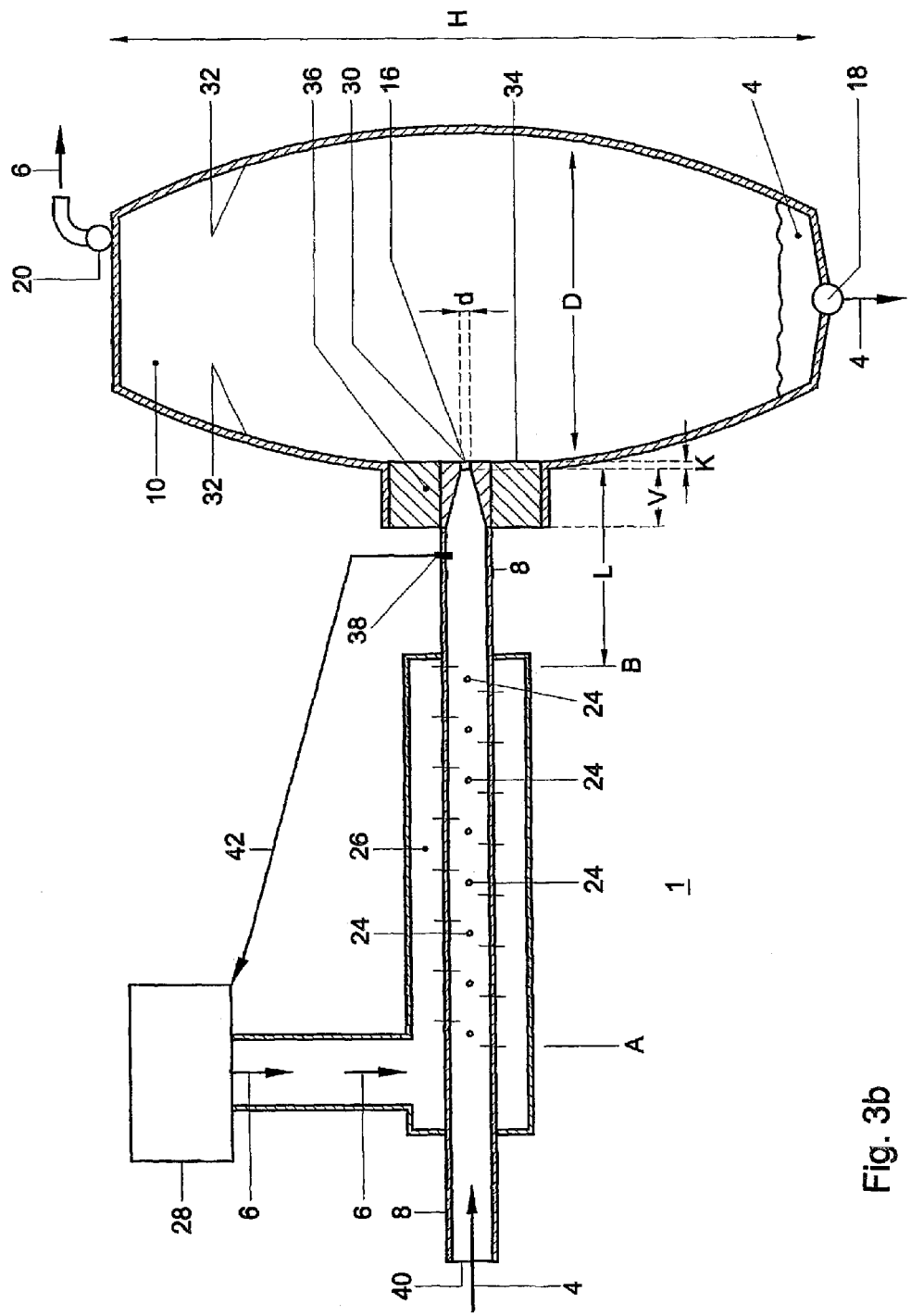
FIG. 3b shows a schematic representation of a second embodiment of a device according to the invention for treating a product with heat.

In the second embodiment according to the invention as shown in FIG. 3b, FIG. 3b and FIG. 3a having corresponding parts provided with the same reference numerals, the outflow opening 16 is situated in a surface of an inner wall 32 of the expansion tank 10. This reduces caking of the product to the walls of the product conduit and to the wall of the expansion tank.

It is noted that the invention is not limited in any way to the embodiments described hereinbefore. Apart from a liquid product, the fluid product can also comprise a suspension/dispersion with particles having a size of, at a maximum, approximately 10% of the diameter of the restriction.

For increasing the capacity of the device, a plurality of product conduits can be connected in parallel, each terminating in the expansion tank. Also, the capacity per product conduit can be raised. In this example, the steam supply openings are each situated downstream of the at least one product supply opening 40. However, it is also possible, for instance, that steam and product are supplied to the product conduit through a T-piece.

Such variants are each understood to fall within the scope of the invention.

The invention claimed is:

1. A device for treating a fluid product, with heat, the device being provided with at least one product conduit through which, in use, the product and steam are transported for treating the product with heat coming from the steam and an expansion tank for cooling the product coming from the product conduit, the product conduit being provided with an outflow opening terminating in the expansion tank, at least one steam inflow opening, at least one product inflow opening and, situated downstream of the steam inflow opening and the product inflow opening, a flow restriction forming a flow resistance, the flow restriction also forms the outflow opening of the product conduit so that, downstream of the restriction, no side walls of the product conduit are present and the restriction terminates directly in the expansion tank, wherein the product conduit extends in an opening of the tank, wherein the product conduit in the opening of the tank is connected to the tank by means of a heat insulating seal and wherein the outflow opening is situated in a surface of an inner wall of the expansion tank.

2. A device according to claim 1, wherein the at least one steam inflow opening is situated downstream of the at least one product inflow opening.

3. A device according to claim 2, wherein the device further includes means for adjusting a volume of the product conduit situated between the at least one steam inflow opening and the restriction.

4. A device according to claim 3, wherein the device further includes means for adjusting the length of the product conduit situated between the steam inflow opening and the restriction.

5. A device according to claim 4, wherein: the device is dimensioned such that, in use, the steam is fully condensed upstream of the restriction; a side wall of the product conduit is provided with the at least one steam inflow opening; the device is further provided with steam supply means for supplying the steam under pressure to the at least one steam inflow opening; the device is further provided with a sensor for measuring the temperature in a part of the product conduit downstream of the at least one steam supply opening and the at least one product supply opening; the steam supply means are arranged for regulating the amount of steam which is supplied to the product conduit depending on the measured temperature; the restriction has a diameter which is in the interval 0.5–5 mm; the restriction has a length which is approximately equal to the diameter of the restriction; and the product conduit is provided with a plurality of steam supply openings provided in a side wall of the product conduit.

6. A device according to claim 5, wherein: the expansion tank has a diameter of at least 500 mm and a height of at least 500 mm; the expansion tank has a content of approximately 180 liters; the restriction in the expansion tank is arranged for forming drops of product, when using a liquid product.

7. A device according to claim 1, wherein the device is dimensioned such that, in use, the steam is fully condensed upstream of the restriction.

8. A device according to claim 1, wherein a side wall of the product conduit is provided with the at least one steam inflow opening.

9. A device according to claim 1, wherein the device is further provided with steam supply means for supplying the steam under pressure to the at least one steam inflow opening.

10. A device according to claim 9, wherein the steam supply means are arranged for regulating the amount of steam which is supplied to the product conduit depending on the measured temperature.

11. A device according to claim 9, wherein the device is further provided with a sensor for measuring the temperature in a part of the product conduit downstream of the at least one steam supply opening and the at least one product supply opening.

12. A device according to claim 11, wherein the steam supply means are arranged for regulating the amount of steam which is supplied to the product conduit depending on the measured temperature.

13. A device according to claim 1, wherein the device is further provided with a sensor for measuring the temperature in a part of the product conduit downstream of the at least one steam supply opening and the at least one product supply opening.

14. A device according to claim 1, wherein the restriction has a diameter which is in the interval 0.5–5 mm.

15. A device according to claim 1, wherein the restriction has a length which is approximately equal to the diameter of the restriction.

16. A device according to claim 1, wherein the restriction has a length less than 3 mm.

17. A device according to claim 1, wherein the product conduit is provided with a plurality of steam supply openings provided in a side wall of the product conduit.

18. A device according to claim 17, wherein the product conduit has a diameter of approximately 10 mm, that the part in which the steam inflow openings are provided extends over a length of approximately 120 mm and that the steam inflow openings each have a diameter of approximately 1 mm.

19. A device according to claim 18, wherein the product conduit is provided with approximately thirty steam inflow openings.

20. A device according to claim 17, wherein: the product conduit has a diameter of approximately 10 mm; the part in which the steam inflow openings are provided extends over a length of approximately 120 mm; the steam inflow openings each have a diameter of approximately 1 mm; and the product conduit is provided with approximately thirty steam inflow openings.

21. A device according to claim 20, wherein: the expansion tank has a diameter of at least 500 mm and a height of at least 500 mm; the expansion tank has a content of approximately 180 liters; the restriction in the expansion tank is arranged for forming drops of product, when using a liquid product.

22. A device according to claim 1, wherein the expansion tank has a diameter of at least 500 mm and a height of at least 500 mm.

23. A device according to claim 1, wherein the expansion tank has a content of approximately 180 liters.

24. A device according to claim 1, wherein the restriction in the expansion tank is arranged for forming drops of product, when using a liquid product.

25. A device according to claim 1, wherein the fluid product is a dairy product.

26. A method for treating a fluid product, with heat, comprising transporting the product with steam through at least one product conduit for treating the product with heat coming from the steam, subsequently supplying the product treated with steam to an expansion tank for cooling the product and wherein in the product conduit a restriction is included, forming with the aid of the restriction, downstream of the restriction in the expansion tank droplets of liquid from the product in the expansion tank wherein the method is executed with the aid of a device for treating a fluid product, with heat, the device being provided with at least one product conduit through which, in use, the product and steam are transported for treating the product with heat coming from the steam and an expansion tank for cooling the product coming from the product conduit, the product conduit being provided with an outflow opening terminating in the expansion tank, at least one steam inflow opening, at least one product inflow opening and, situated downstream of the steam inflow opening and the product inflow opening, a flow restriction forming a flow resistance, the flow restriction also forms the outflow opening of the product conduit so that, downstream of the restriction, no side walls of the product conduit are present and the restriction terminates directly in the expansion tank, wherein the product conduit extends in an opening of the tank, wherein the product conduit in the opening of the tank is connected to the tank by means of a heat insulating seal and wherein the outflow opening is situated in a surface of an inner wall of the expansion tank.

27. A method according to claim 26, further comprising condensing the steam before the steam is supplied, together with the product, to the restriction.

28. A method according to claim 27, further comprising situating the at least one steam inflow opening downstream of the at least one product inflow opening, wherein the device further includes means for adjusting a volume of the product conduit situated between the at least one steam inflow opening and the restriction; wherein the device further includes means for adjusting the length of the product conduit situated between the steam inflow opening and the restriction; wherein the device is dimensioned such that, in use, the steam is fully condensed upstream of the restriction; a side wall of the product conduit is provided with the at least one steam inflow opening; the device is further provided with steam supply means for supplying the steam under pressure to the at least one steam inflow opening; the device is further provided with a sensor for measuring the temperature in a part of the product conduit downstream of the at least one steam supply opening and the at least one product supply opening; arranging the steam supply means for regulating the amount of steam that is supplied to the product conduit depending on the measured temperature; the restriction has a diameter which is in the interval 0.5–5 mm; the restriction has a length which is approximately equal to the diameter of the restriction; and providing the product conduit with a plurality of steam supply openings in a side wall of the product conduit.

29. A method according to claim 28, further comprising providing an expansion tank with a diameter of at least 500 mm and a height of at least 500 mm; the expansion tank has a content of approximately 180 liters; and arranging the restriction in the expansion tank for forming drops of product when using a liquid product.

30. A method according to claim 27, further comprising providing the product conduit with approximately thirty steam inflow openings extending over a length of approximately 120 mm in a side wall of the product conduit; wherein the product conduit has a diameter of approximately 10 mm, and wherein the steam inflow openings each have a diameter of approximately 1 mm.

31. A method according to claim 30, further comprising providing an expansion tank with a diameter of at least 500 mm and a height of at least 500 mm; the expansion tank has a content of approximately 180 liters; and arranging the restriction in the expansion tank for forming drops of product when using a liquid product.

32. A method according to claim 26, wherein the fluid product is a dairy product.

* * * * *